INVENTOR
ROBERT G. MINER
BY Holmes & Andersen
ATTORNEYS

Oct. 3, 1961 R. G. MINER 3,002,359
ABSORPTION REFRIGERATING SYSTEM
Filed July 28, 1959 2 Sheets-Sheet 2

INVENTOR
ROBERT G. MINER
BY
*Holmes & Andersen*
ATTORNEYS 3,002,359
ABSORPTION REFRIGERATING SYSTEM
Robert G. Miner, La Crosse, Wis., assignor to The Trane Company, La Crosse, Wis., a corporation of Wisconsin
Filed July 28, 1959, Ser. No. 830,109
5 Claims. (Cl. 62—148)

This invention relates to absorption refrigerating systems and more particularly to controls for such systems.

It is an object of this invention to provide means for starting the various parts in sequence responsive to manually closing an electrical circuit to one of the pumps.

It is another object of the invention to provide means for discontinuing operation in such a manner that concentration of solution and solidification is avoided.

It is an object of this invention to provide means for controlling the refrigeration capacity of an absorption refrigerating system which uses a heated liquid as a source of heat in the generator of the system.

It is another object of this invention to provide control of the heat input to the generator of an absorption refrigerating system by varying the difference in temperature between the heating fluid entering and leaving the generator responsive to the temperature of the evaporator or the liquid cooled by the evaporator.

Other objects and advantages will become apparent as the specification proceeds to describe the invention with reference to the accompanying drawings in which.

Figure 1:
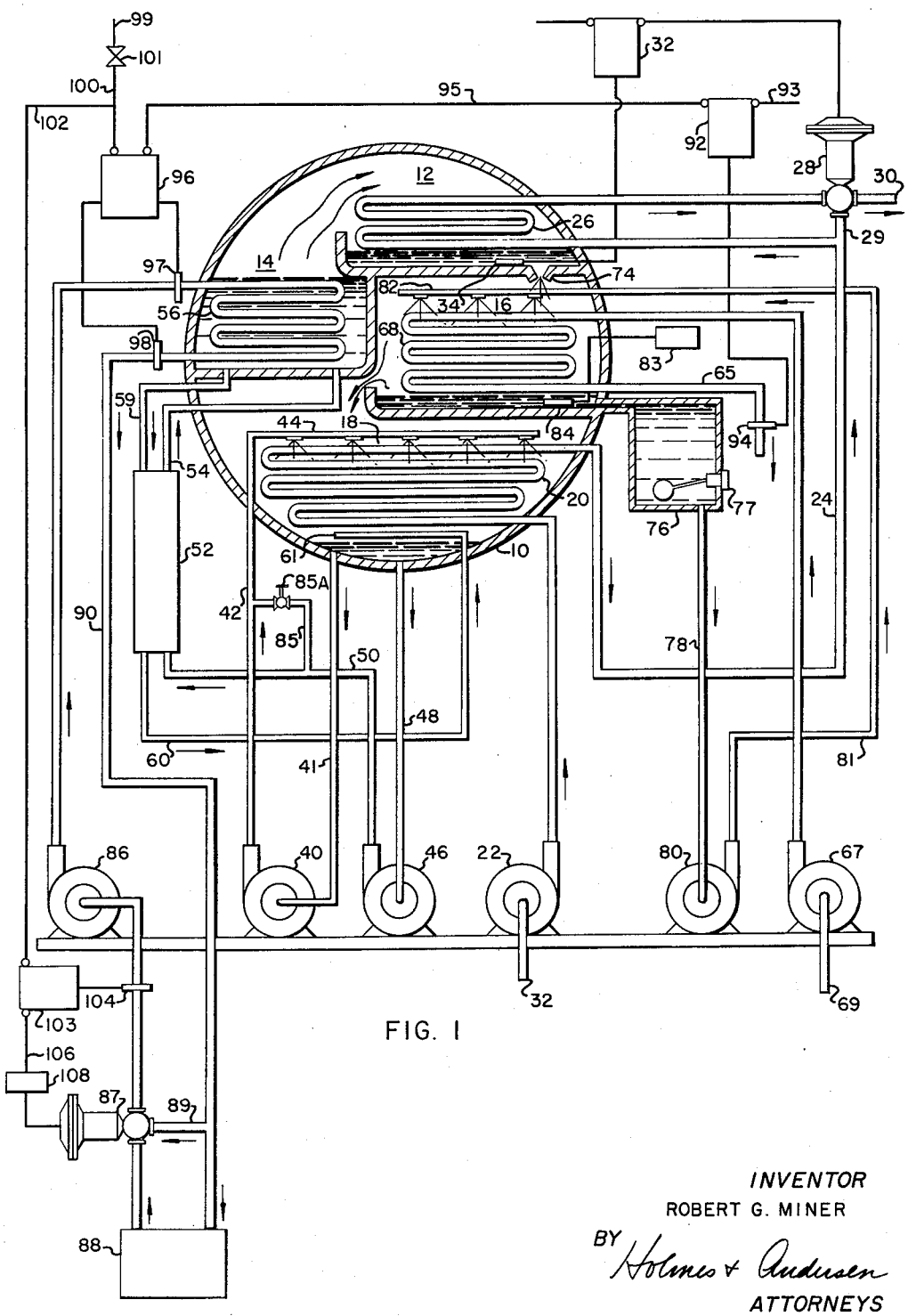
FIG. 1 is a diagrammatic view of the absorption system including the controls.

Referring now to FIG. 1, the absorption system shown has a single shell 10 enclosing a condenser 12, a generator 14, an evaporator 16 and an absorber 18. It should be understood that other arrangements might be used; for instance, the generator and condenser could be in one shell and the absorber and evaporator could be in a second shell with conduits therebetween for conducting fluids.

The absorber 18 has a coil 20 supplied with cooling fluid by a pump 22 from a source of water 32 which is preferably of substantially constant temperature. This cooling fluid is conducted from the coil 20 through a conduit 24 to a cooling coil 26 in the condenser 12. From the cooling coil 26, the cooling fluid passes through a pneumatic valve 28 and thence through a conduit 30 to a cooling tower not shown or to waste. A portion of the fluid flowing in pipe 24 may bypass the coil 26 through the conduit 29 according to the position of the pneumatic valve 28 which is controlled by pneumatic thermostat 32 which has a temperature sensing bulb 34 in the liquid in the condenser 12. Refrigerant vapor from the generator 14 is condensed in condenser 12 by removal of heat through cooling coil 26.

Various types of refrigerant and absorbent may be used in the present machine. A solution of lithium bromide and water is satisfactory. Other salt solutions may be used if desired.

A solution circulating pump 40 receives solution from the absorber 18 through conduit 41, and discharges the solution into a conduit 42 which is connected to a spray tree 44 which sprays the solution into the absorber 18 over the tubes 20.

A pump 46 draws solution from the absorber 18 through a conduit 48 and discharges the solution through a conduit 50 which conducts the fluid to a heat exchanger 52 from which the fluid flows through a conduit 54 to the generator 14.

The solution in the generator is heated by a coil 56 which is supplied with a heating liquid such as water, Dow-Therm, etc. in a manner described below. Boiling of the solution in the generator causes refrigerant vapors to pass into the condenser 12. The concentrated solution flows from the generator 14 through conduit 59 to heat exchanger 52 and thence through conduits 60 and 61 to the absorber 18. The outlet of conduit 61 is adjacent the entrance to conduit 41 and remote from the entrance to conduit 48 so that the solution flowing in conduit 41 is more concentrated than the solution flowing in conduit 48. The conduits 41 and 48 may be spaced longitudinally of the shell for the same reason if desired. In the heat exchanger 52, the dilute solution passing from the absorber 18 to the generator 14 is heated by the concentrated solution flowing from the generator 14 to the absorber 18. The fluid in circulation through the coil 63 of the evaporator 16 may be water, brine, or other fluid, but for purposes of explanation it will be assumed to be water, and it will be called chilled water. A chilled water pump 67 is connected to receive chilled water from a refrigeration load through a conduit 69. After flowing through coil 68, the chilled water is returned to the refrigeration load through conduit 65.

The refrigerant condensed in the condenser 12 flows downwardly through an opening 74 into the evaporator 16. The evaporator has a float chamber 76 containing a float switch 77 which opens when the level drops below a predetermined point. A conduit 78 conducts a refrigerant from the float chamber 76 to a refrigerant pump 80. The refrigerant flows from the pump 80 through a conduit 81 to a spray tree 82 in the evaporator 16. As indicated by arrows, refrigerant vapor flows from the evaporator 16 to the absorber 18 thus causing evaporation and cooling of the refrigerant liquid in the evaporator 16.

A low temperature cut-out switch 83 has a temperature sensitive bulb 84 in the refrigerant in the evaporator 16. Switch 83 initiates a shut down of the machine when the evaporator temperature drops below a predetermined point as is explained in detail in my co-pending application, Serial No. 760,879, filed September 15, 1958.

A conduit 85 conducts fluid from conduit 50 to conduit 42. A valve 85A provides means for regulating flow in conduit 85. As is explained more fully in my co-pending application, Serial No. 760,879, filed September 15, 1958, the absorber recirculating pump 40 and the condenser water pump 22 are the first pumps to be de-energized when the machine is shut down. Inasmuch as the solution pump 46 continues to operate for a timed period, a portion of the solution delivered by it will flow through conduit 85. This solution will flow by gravity downward through pipe 42, then through pump 40 into conduit 41 and finally into the bottom of the absorber 18. The more concentrated solution in these conduits and in pump 40 is thus flushed out by the more dilute solution from pump 46 and the danger of solidification in these passageways when the system cools down is avoided. The solution in the spray tree 44 drains by gravity when the pump 40 is de-energized. When the machine is in normal operation, the pressure developed by pump 40 opposes flow through conduit 85 so that there is substantially no flow in this conduit 85.

The coil 56 in the generator 14 is supplied with heating liquid by a pump 86 driven by an electric motor or other suitable prime mover not shown. A pneumatic three way valve 87 has a normally closed connection to a heating source 88 such as a hot water boiler. Valve 87 has a normally open connection to conduit 89 which receives fluid from conduit 90. Conduit 90 conducts fluid from the coil 56 back to the heating source 88. Valve 87 is connected to deliver fluid to the suction of the pump 86.

The control of the valve 87 will now be described. A chilled water pneumatic thermostat 92 is connected to the usual source of air under pressure 93 and has a temperature sensitive bulb 94 in temperature sensing relationship with the chilled water leaving the evaporator coil 68 through the conduit 65. A rise in temperature of the water in conduit 65 indicates an increase in load imposed upon the system. Thermostat 92 is a commercially available instrument which transmits pressure, through conduit 95, of a magnitude proportional to the temperature of the fluid measured. Thermostat 92 being connected to a source of pneumatic pressure 93 transmits pressure through conduit 95 to a differential temperature controller 96. Controller 96 has a temperature sensitive bulb 97 in temperature sensing relationship with the liquid flowing from the pump 86 to the coil 56. The controller 96 has a second temperature sensitive bulb 98 in temperature sensing relationship with the liquid flowing in conduit 90 which conducts liquid from the coil 56. The controller 96 is connected to a pnuematic pressure source 99 by a conduit 100. A pressure reducing restrictor 101 is interposed in the conduit 100 between the source 99 and the controller 96. The construction of the differential temperature controller will be described in more detail later in the specification.

Conduit 100 is connected by conduit 102 to a reverse acting pneumatic thermostat 103 which is commercially available and which transmits pressure inversely proportional to the temperature measured. Thermostat 103 has a temperature sensitive bulb 104 in temperature sensing relationship with the fluid flowing from valve 87 to pump 86. Thermostat 103 transmits pressure to pneumatic valve 87 through conduit 106. A solenoid valve 108 is in the conduit 106. Solenoid valve 108 may be closed by switch means not shown when it is desired to terminate the flow of heating fluid to the generator coil 56.

Figure 2:
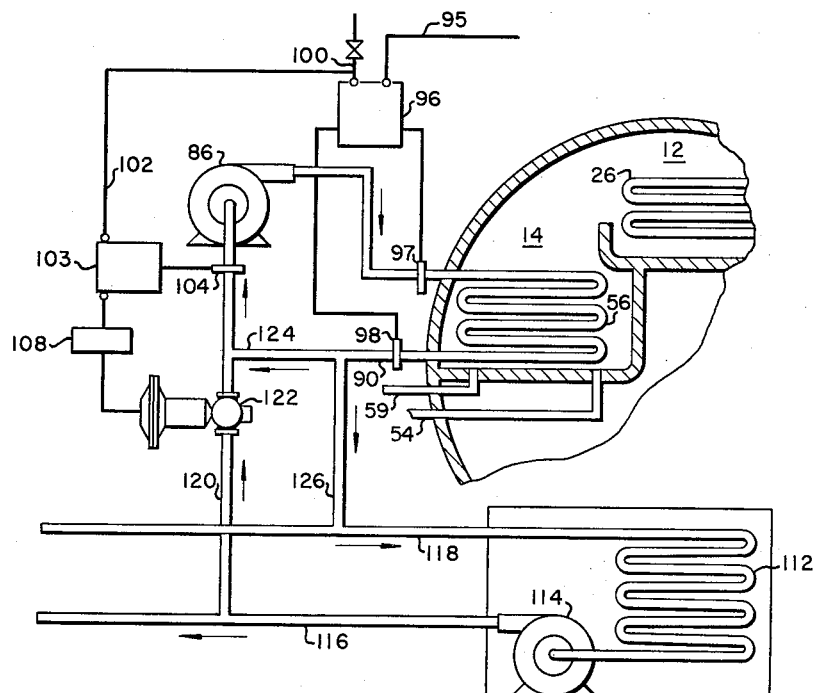
FIG. 2 is a diagrammatic view of a second form of the absorption system and the controls thereof.

The modification of FIG. 2 will now be described. Parts which correspond with parts in the form of FIG. 1 have the same designating numerals. A hot water boiler 110 has a heat exchanger 112 heated in any suitable manner as by products of combustion. A pump 114 circulates the heating fluid through the system supply main 116 and the system return main 118. A conduit 120 conducts fluid from supply main 116 to a normally closed pneumatic two-way valve 122. The conduit 90 conducts fluid to conduit 124 which conducts fluid to the pump 86 and to conduit 126 which conducts fluid to the return main. When the valve 122 is closed, the pump 86 merely recirculates fluid leaving the coil 56 through conduit 90. As the demand for heat increases, the valve 122 opens increasing amounts to increase the flow of heating fluid from the main 116 to the pump 86. The pressure in the supply main is considerably greater than the pressure in the return main. Therefore, when the valve 122 is fully open, the temperature of heating fluid flowing to the pump 86 and thence to the generator could be equal to that in the conduit 116. Such a temperature could damage the apparatus. For this reason, a high limit thermostat 103 having a bulb 104 limits the pressure transmitted to the valve 122 to prevent the temperature of the water flowing to pump 86 from exceeding a predetermined point.

Figure 3:
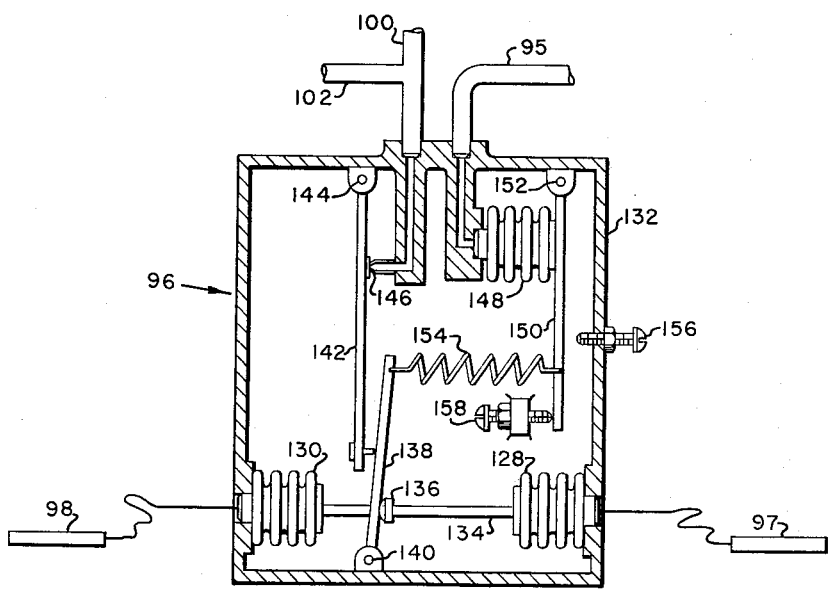
FIG. 3 is a cross-sectional diagrammatic view of the submaster differential thermostat.

The differential temperature controller will now be described with reference to FIG. 3 of the drawings. Bellows 128 and 130 are mounted in the base 132 of the controller. Bellows 128 is connected to bulb 97 and bellows 130 is connected to bulb 98. A rod 134 is connected between the bellows 128 and 130 and has an abutment 136 which acts against a lever 138 pivoted to the base 132 at 140. The position of the rod 134 is determined by the difference in temperature between the bulb 97 and the bulb 98. Lever 138 acts against lever 142 which is pivoted to the base 132 at 144. The lever 142 covers a bleed port 146 and, according to its distance from said bleed port, controls the flow from said bleed port. With bleed port fully closed, the pressure in conduit 100 is transmitted to conduit 102. As bleed port 146 is opened increasing amounts, the pressure transmitted to conduit 102 is reduced by increasing amounts. The conduit 95 from the chilled water thermostat is in fluid communication with the interior of a bellows 148 which acts against a lever 150 pivoted at 152. A spring 154 applies an opposing force to lever 138. Bellows 148 acting through lever 150 varies the tension of the spring 154. Screws 156 and 158 are adjustably threadedly mounted on the base 132 and engage opposite sides of the lever 150 to limit its travel thus limiting the range through which the bellows 148 may vary the tensions of the spring 154. Bellows 128 and 130 vary the pressure in conduit 102 to control the valve 87 to maintain a predetermined temperature difference between the fluids entering and leaving the coil 56. Bellows 148 varies the tension of spring 154 responsive to the pressure received from the chilled water thermostat 92. Varying the tension of spring 154 causes differential temperature controller to control at a different temperature difference.

The operation of the system will now be described. Referring to FIG. 1, when the chilled water thermostat 92 senses an increase of the temperature of the liquid in the conduit 65 as a result of an increase in the cooling load of the system, it will increase its air pressure in the conduit 95 which in turn will cause the differential thermostat 96 to be set to maintain a somewhat higher difference in temperature between its sensing bulbs 97 and 98. This change in setting of the differential thermostat 96 will cause it to raise its output air pressure in the conduit 102 which will pass through the pneumatic high limit thermostat 103, the solenoid valve 108, to the 3-way valve 87. This increase in pressure will cause the 3-way valve to reduce the flow of recirculated heating medium through the conduit 89 and increase the quantity of heating medium flowing to the pump 86 from the source 88 thus increasing the quantity of heat supplied to the generator 56. This increase in heat input will continue until the entire system reaches a new equillibrium where the amount of heating medium introduced into the loop, consisting of the pump 86, the generator 56, the conduit 90, and the bypass conduit 89, is just sufficient to provide the necessary cooling effect to maintain the temperature in the conduit 65 at the setting of the chilled water thermostat 92.

On reduction in load on the cooling system, the reverse will occur; namely, the chilled water thermostat 92 will reduce the differential setting of the differential thermostat 96 which in turn will increase the recirculated heating medium through the conduit 89 and reduce the flow of heating medium from the source 88 until equilibrium is again reached.

Since the maintenance of the differential temperature between the inlet and outlet of the generator 56 as measured by the bulbs 97 and 98 of the differential thermostat 96 is dependent on the rate at which the heat is dissipated from the generator coil 56, the maximum setting of the differential thermostat 96 will determine the highest rate of heat input which may be provided to the generator.

For this same reason should an abnormal condition exist in the generator 14 which would not permit the full input of heat to be dissipated, the differential thermostat 96 would call for increasing amounts of heating medium to be fed into the circulating loop from the source 88 and the temperature in this loop would approach that of the source. To prevent such an occurrence, the high limit pneumatic thermostat 103 and its bulb 104 senses the temperature of the mixture entering the pump 86 and prevents the valve 87 from increasing the flow of heating medium into the circuit when the temperature at the bulb 104 exceeds a predetermined value.

Although I have described specific embodiments of my invention, it is contemplated that various changes may

I claim:

1. In an absorption refrigeration system, the combination of an absorber, an evaporator, a condenser, and a generator placed in a closed circuit, the circuit containing a solution of an absorbent and a refrigerant, means for circulating solution through the system, means for circulating heating liquid from a heating source to said generator and back to the heating source, means for recirculating a portion of the heating liquid leaving the generator directly back through said generator without passing through the heating source, and means for increasing the volume rate of liquid recirculated responsive to a decrease in temperature of said evaporator.

2. In an absorption refrigeration system, the combination of an absorber, an evaporator, a condenser, and a generator placed in a closed circuit, the circuit containing a solution of an absorbent and a refrigerant, means for circulating the solution through the system, a closed loop conduit including said generator, means in said closed loop conduit for circulating heating liquid therein, means for supplying heating liquid to and withdrawing heating liquid from said closed loop conduit, valve means for regulating the flow in said last named means, control means for said valve means to maintain a predetermined difference in temperature between the liquid entering and leaving said generator, and means responsive to a change in load imposed upon the system for adjusting said control means to vary the magnitude of said predetermined difference in temperature maintained by said control means.

3. In an absorption refrigeration system, the combination of an absorber, an evaporator, a condenser, and a generator placed in a closed circuit, the circuit containing a solution of an absorbent and a refrigerant, means for circulating the solution through the system, a closed loop conduit including said generator, means in said closed loop conduit for circulating heating liquid therein, means for supplying heating liquid of a substantially high temperature to said closed loop and withdrawing heating liquid from said closed loop conduit, valve means for regulating the flow in said last named means, control means for said valve means to maintain a predetermined difference in temperature between the liquid entering and leaving said generator, and means responsive to the temperature of said evaporator for adjusting said control means to vary the magnitude of said predetermined difference in temperature maintained by said control means.

4. In an absorption refrigeration system, the combination of an absorber, an evaporator, a condenser, and a generator placed in a closed circuit, the circuit containing a solution of an absorbent and a refrigerant, means for circulating the solution through the system, a closed loop conduit including said generator, means in said closed loop conduit for circulating heating liquid therein, means for supplying heating liquid to and withdrawing heating liquid from said closed loop conduit, valve means for regulating the flow in said last named means, control means for said valve means to maintain a predetermined difference in temperature between the liquid entering and leaving said generator, means responsive to a change in load imposed upon the system for adjusting said control means to vary the magnitude of said predetermined difference in temperature maintained by said control means, and means responsive to the temperature of the heating liquid in said closed loop conduit for limiting said control means to prevent the temperature of heating liquid in said closed loop conduit from exceeding a predetermined maximum temperature.

5. In an absorption refrigeration system, the combination of an absorber, an evaporator, a condenser, and a generator placed in a closed circuit, the circuit containing a solution of an absorbent and a refrigerant, a first conduit for conducting heating liquid to said generator, a second conduit for conducting heating liquid from said generator, said first and second conduits being adapted to be connected to a liquid heater, a pump in one of said first and second conduits, a third conduit for conducting heating liquid from said second conduit to said first conduit, at a point upstream from said pump, a valve in at least one of said first and third conduits for regulating flow therethrough, control means for said valve to maintain a predetermined difference in temperature between the liquid in said second conduit and the liquid in said first conduit downstream of said valve, and means responsive to an increase in the temperature of said evaporator for adjusting said control means to increase the magnitude of said predetermined difference in temperature maintained by said control means.

References Cited in the file of this patent

UNITED STATES PATENTS

| | | |
|---|---|---|
| 2,293,556 | Newton | Aug. 18, 1942 |
| 2,356,556 | Andersson | Aug. 22, 1944 |
| 2,473,389 | Reid | June 14, 1949 |
| 2,481,297 | Eggert | Sept. 6, 1949 |
| 2,519,266 | Main | Aug. 15, 1950 |
| 2,582,838 | Leonard | Jan. 15, 1952 |
| 2,666,298 | Jones | Jan. 19, 1954 |
| 2,733,575 | Leonard | Feb. 7, 1956 |